(12) United States Patent
Yeh

(10) Patent No.: US 9,276,515 B2
(45) Date of Patent: Mar. 1, 2016

(54) MOTOR CONTROLLER WITH INTEGRATED METERING FUNCTION

(71) Applicant: Thomas I. Yeh, Rochester, NY (US)

(72) Inventor: Thomas I. Yeh, Rochester, NY (US)

( * ) Notice: Subject to any disclaimer, the term of this patent is extended or adjusted under 35 U.S.C. 154(b) by 11 days.

(21) Appl. No.: 14/460,883

(22) Filed: Aug. 15, 2014

(65) Prior Publication Data
US 2015/0048775 A1    Feb. 19, 2015

Related U.S. Application Data

(60) Provisional application No. 61/866,527, filed on Aug. 15, 2013.

(51) Int. Cl.
*H02P 21/00* (2006.01)
*H02P 25/02* (2006.01)
*H02P 23/00* (2006.01)
*H02P 31/00* (2006.01)
*H02P 25/00* (2006.01)

(52) U.S. Cl.
CPC ............ *H02P 25/02* (2013.01); *H02P 23/0081* (2013.01); *H02P 25/00* (2013.01); *H02P 31/00* (2013.01)

(58) Field of Classification Search
CPC ...... H02P 27/16; H02P 23/0081; H02P 25/02
USPC ......... 318/806, 786, 805, 807, 812, 442, 453, 318/455, 458, 478, 479
See application file for complete search history.

(56) References Cited

U.S. PATENT DOCUMENTS

| | | | | |
|---|---|---|---|---|
| 6,611,126 B2 * | 8/2003 | Mizuno | ............... | B29C 45/7666 264/328.1 |
| 7,176,648 B2 * | 2/2007 | Choi | ................... | B29C 45/7666 318/370 |
| 8,014,110 B2 * | 9/2011 | Schnetzka | ............. | F25B 49/025 318/434 |
| 8,242,719 B2 * | 8/2012 | Kubal | ....................... | H02P 1/30 318/102 |
| 8,310,181 B2 * | 11/2012 | Taniguchi | ........... | H02P 23/0036 318/400.02 |

\* cited by examiner

*Primary Examiner* — Bentsu Ro
*Assistant Examiner* — Thai Dinh
(74) *Attorney, Agent, or Firm* — Bassett IP Strategies; David F. Bassett

(57) ABSTRACT

A motor controller is provided with integrated metering and data logger functions to measure, store and report information suitable to verify the controller's energy saving performance. The integrated functions in the controller can be used to establish an AC motor's baseline electrical power and energy profile and to monitor continuously the power and energy reduction performance of the controller without requiring a separate meter and logger.

20 Claims, 6 Drawing Sheets

MOTOR CONTROLLER WITH INTEGRATED METERING FUNCTION

CROSS-REFERENCE TO RELATED PATENT APPLICATIONS

Priority for this patent application is based upon provisional patent application 61/866,527 (filed on Aug. 15, 2013). The disclosure of this United States patent application is hereby incorporated by reference into this specification.

BACKGROUND

The application generally relates to a controller for an AC motor. The application relates more specifically to a controller for an AC motor with integrated metering functions to measure, store and communicate data suitable to verify the energy saving performance of the controller.

Alternating current (AC) motors are major consumers of electricity in the U.S. accounting for over 60% of the nation's electricity consumption. The U.S. Department of Energy estimates that improved control systems for AC motors in pump, fan, and compressed air systems could save nearly 15,000 gigawatt-hours per year and potentially $900 million per year in energy savings. The potential to obtain such energy savings has resulted in the promotion of "high efficiency" and "premium efficiency" AC motors for use in many applications. "High efficiency" and "premium efficiency" are terms used by motor manufacturers to describe motors conforming to the minimum efficiency standards instituted by the National Electrical Manufacturers Association (NEMA) and described in various Energy Policy Acts passed by the U.S. Congress. "High efficiency" and "premium efficiency" motors can typically cost 10-25% more than standard motors while providing, in general terms, several percentage points higher efficiency than standard motors under rated load. Alternatively, energy savings can be obtained by reducing the electricity consumption of existing AC motors. In facilities that use many AC motors, the potential energy savings to be obtained by reducing the electricity consumption of each motor at the facility can be substantial.

AC motor controllers and drives, such as a variable speed drive (VSD), a variable frequency drive (VFD), and variable load controller (VLC), can be designed to reduce the electrical power and energy consumption of AC motors. However, the cost for an AC motor controller or drive and the corresponding labor to install such a device could easily cost hundreds of dollars for a single-phase, fractional horsepower (HP), e.g., ½ or ¼ HP, motor, and thousands of dollars for a three-phase, large HP, e.g. 50 HP, motor. Therefore, an economic analysis should be performed to understand whether the potential savings to be obtained from an AC motor controller or drive can justify the cost associated with installing an AC motor controller or drive.

An effective economic analysis of an AC motor requires the collecting of electric power and energy consumption data for the AC motor prior to the installation of an AC motor controller or drive to establish a baseline condition for the AC motor. The effective economic analysis of the AC motor also requires the continuous monitoring of the electric power and energy consumption of the same AC motor after the installation of the AC controller or drive. In addition to being used in an economic analysis of the AC motor, data collection is also useful to support utility incentives and rebates associated with energy savings or reduced power consumptions of the AC motor.

While data collection is a significant part of an effective economic analysis of an AC motor, the data collection part of the analysis has historically been expensive and time consuming. The cost of the data collection function has to be included in the economic analysis of the motor in order to obtain meaningful results. Often, data collection is only performed on a representative sample of a particular type of AC motor and for a representative period. For AC motors used in applications with varying loading conditions, changes in the operation of the AC motor from the change in loading conditions may render the one-time collected data on the AC motor obsolete and inappropriate for analysis.

Therefore what is needed is a system and method that can collect, store and transmit data regarding the operation of the motor for energy savings analysis and can re-establish baseline conditions for the motor in response to changes in loading conditions or operating conditions for the motor.

SUMMARY

The present application relates to a method of determining performance of a controller for an alternating current (AC) motor. The method includes installing the controller between an AC power source and the AC motor, the controller having at least one control algorithm to control operation of the AC motor, executing a first data gathering algorithm to obtain a first data set relating to the operation of the AC motor, and executing a second data gathering algorithm to obtain a second data set relating to the operation of the AC motor. The step of executing the first data gathering algorithm includes closing a relay in the controller to provide AC power directly to the AC motor from the AC power source, measuring data relating to the AC motor in response to the relay being in a closed position, and storing in the first data set the measured data relating to the AC motor in response to the relay being in a closed position. The step of executing the second data gathering algorithm includes opening the relay in the controller to prevent direct transfer of AC power from the AC power source to the AC motor, controlling activation of a power switch in the controller with the control algorithm to control the AC power provided to the AC motor, measuring data relating to the AC motor in response to controlling activation of the power switch in the controller with the control algorithm, and storing in the second data set the measured data relating to the AC motor in response to controlling activation of the power switch in the controller with the control algorithm. The method also includes comparing the second data set to the first data set to calculate a difference between the second data set and the first data set and communicating the difference to a user. The communicated difference is representative of a change in performance of the AC motor resulting from executing the control algorithm.

The present application further relates to a controller for an alternating current (AC) motor. The controller includes an input connection to receive AC power from an AC power source, an output connection to provide AC power to the AC motor, a power switch connected to the input connection and the output connection, a relay electrically connected in parallel with the power switch and a controller circuit configured to activate the power switch and to open and close the relay. The power switch is configured to permit transfer of AC power from the input connection to the output connection in response to being activated by the controller circuit. The relay is configured to bypass the power switch when in a closed position to permit transfer of AC power between the input connection and the output connection. The controller further includes a memory device storing a control algorithm executable by the controller circuit. The control algorithm is configured to control activation of the power switch by the controller circuit. The memory device is configured to store performance data on the AC motor. The controller circuit is configured to obtain performance data on the AC motor by collecting and comparing performance data on the AC motor in response to the AC power to the AC motor being controlled by the relay and in response to the AC power to the motor being controlled by the power switch.

DETAILED DESCRIPTION OF THE EXEMPLARY EMBODIMENTS

Figure 1:
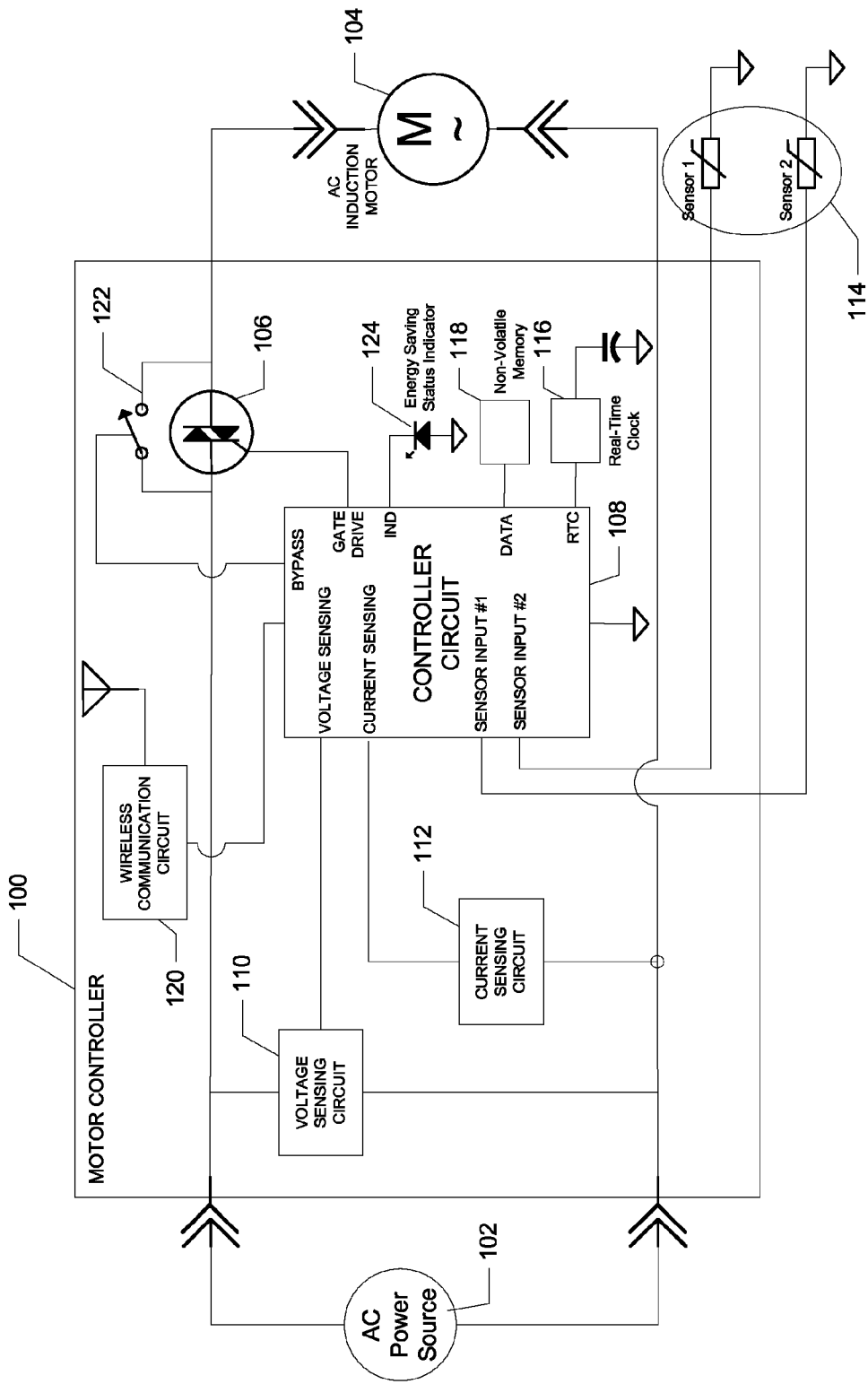
FIG. 1 schematically shows an exemplary embodiment of a motor controller for an AC motor.

FIG. 1 shows an exemplary embodiment for a controller for an AC motor. A controller 100 can have an input connection to receive AC power having a fixed voltage and fixed frequency from an AC power source 102 and an output connection to provide power to an AC motor 104 at a selected voltage and selected frequency that may be different from the fixed voltage and fixed frequency provided to the controller 100. The AC power source 102 can provide single phase or multiphase (e.g., three phase), fixed voltage, and fixed frequency AC power to the controller 100. The AC power source 102 can be the AC power grid or distribution system that is available at a site or the AC power source 102 can be an alternative source of AC power such as AC power generated at the site by a generator. In an exemplary embodiment, the AC power source 102 can supply an AC voltage of 110 volt alternating current (VAC), 120 VAC, 208 VAC, 240 VAC or 277 VAC for single-phase applications and 480 VAC for three-phase applications at a frequency of 50 hertz (Hz) or 60 Hz. The motor 104 can be any type of AC induction electric motor that can be powered by a controller and can have a rated horsepower of less than 1 horsepower (HP) to more than 500 HP. In an exemplary embodiment, the motor 104 can have a rated horsepower of between ¼ HP and 100 HP.

The controller 100 can control the power, i.e., voltage and current, provided to the motor 104 with a semiconductor power switch 106. The semiconductor power switch 106 can be a TRIAC (TRIode Alternating Current switch), two SCRs (Silicon-Controlled Rectifiers) connected in parallel, a MOSFET (Metal Oxide Semiconductor Field Effect Transistor), an IGBT (Insulated Gate Bipolar Transistor) or any other suitable type of semiconductor power switch. For example, the power switch can be Littlefuse-Teccor S8025L SCR (800V, 25 amp (A), isolated tab). In an exemplary embodiment, the power switch 106 can be turned-on or activated by a signal, such as a Gate Drive signal, generated by a controller circuit 108 on an AC cycle by AC cycle basis, i.e., the signal for the power switch 106 can be timed based on the AC voltage waveform from the AC power source 102. The controller circuit 108 can provide the power switch 106 with a momentary activate or on signal that is delayed from the zero crossing of the AC voltage and then the power switch 106 can then self-deactivate or turn-off at the next zero crossing of the AC voltage. Alternatively, the power switch 106 can receive a continuous activate or on signal from the controller circuit 108 between consecutive zero crossings of the AC voltage. The controller circuit 108 can repeat the process at the next voltage cycle from the AC power source 102. In other embodiments, any suitable technique or algorithm can be used by the controller circuit 108 to generate the activate signals for the power switch 106.

The controller circuit 108 can execute one or more control algorithms or programs, such as energy saving control algorithms, to control the power switch 106 to get a particular performance from the motor 104. In an exemplary embodiment of an energy saving control algorithm, the controller circuit 108 can reduce the effective Root-Mean-Square (RMS) value of the voltage energizing the motor 104 by delaying the activate signal to the power switch 106 from the natural zero crossing of the AC voltage. The reduction in RMS voltage energizing the motor 104 can equate to a reduction in the power and energy consumption of the motor 104. Further, the reduction in RMS voltage energizing the motor 104 can be proportional to the delay in activating the power switch 106 from the zero crossing of the AC voltage. In other words, the larger the delay in providing the activate signal from the AC voltage's zero crossing, the lower the RMS voltage energizing the motor 104. However, the proportional relationship between the delay in activating the power switch 106 and the reduction in the RMS voltage can only be used in situations where the activate signal is provided before the next zero crossing of the AC voltage.

The controller circuit 108 can include a microprocessor, analog-to-digital (A/D) converters, interface modules, memory devices, clocks and other similar types of devices, modules and/or circuits. The components and/or functions of the controller circuit 108 can be incorporated into a single device, chip or integrated circuit or can be incorporated on multiple devices, chips or integrated circuits. In an exemplary embodiment, the controller circuit 108 can include a microprocessor with integrated capabilities. Some of the capabilities that can be included in the microprocessor are analog to digital (A/D) converters to process and measure the AC waveforms or signals from a voltage sensing circuit 110, a current sensing circuit 112 and one or more external sensors 114. For example, the microprocessor can be a Texas Instruments (TI) MSP430F247TPM microcontroller. Sensors 114 can measure any desired system parameter such as temperature, pressure, humidity, fluid flow, motor speed or any other suitable system parameter. In another exemplary embodiment, the input to the controller circuit 108 from sensors 114 may be replaced by control signals, e.g., 0-10 V signals, provided by a control system when the controller 100 is connected to a larger control system such as a building energy management system.

In an exemplary embodiment, the sensors 114 can be temperature sensors, such as probes using thermistors, Resistance Temperature Detectors (RTDs), thermocouples or any other suitable temperature sensing element. For example, the temperature sensor can be an Epcos B57020 thrermistor probe. In a further exemplary embodiment, the temperature sensor can be a temperature thermistor that outputs a resistance that is proportional to the measured temperature. The resistance from the thermistor can then be converted to a voltage signal, using a resistor divider connected to a voltage source or any other suitable technique for generating a voltage. The voltage signal from the temperature sensor can then be transferred to the controller circuit 108. The voltage signal input to the controller circuit 108 can be converted to a digital signal or word by an A/D converter.

The microprocessor of controller circuit 108 can be programmed with firmware to implement energy saving strategies and other control processes or techniques, such as a soft-start technique(s) for the motor and motor breaking controls. In another embodiment, the energy saving strategies executed by the microprocessor can be stored as software code or a computer program(s) in a rewritable memory device and updated to provide for further energy savings or to adapt to changing circumstances. The microprocessor of controller circuit 108 can measure the magnitude of the AC voltage from the voltage sensing circuit 110, the magnitude of the AC current from the current sensing circuit 112, and the relative phase difference between the AC voltage and AC current. The microprocessor of controller circuit 108 can also use the measured AC voltage and AC current values to calculate an RMS voltage, an RMS current, a phase angle between the voltage and current waveforms, a real-power and a real-energy as provided for in the firmware or other software code or computer programs. After measuring or calculating the previous values, the microprocessor can apply a time-stamp, i.e., a date and time, to the values based on information from real-time clock 116 and can then store the time-stamped records in a non-volatile memory device 118.

The records can be continuously and periodically stored or updated in non-volatile memory device 118. In an exemplary embodiment, the records can be updated in the non-volatile memory device 118 at a frequency that can vary between about 5 minutes and about 15 minutes. In another embodiment, the records can be updated at a frequency of between about 1 minute and about 60 minutes. Updating the records more frequently may require a larger non-volatile memory device 118 to store data for the same amount of time as compared to less frequent record updates. In addition, the periodicity of the records being collected by a computer, gateway device or by an operator can also determine the total size of the non- volatile memory device 118.

The real-time clock 116 can be an integrated circuit with a super-capacitor to provide back-up power to the circuit in the event of power outage. In another embodiment, a battery could be used in place of the super-capacitor to provide back-up power. In a further embodiment, the real-time clock 116 can be any suitable circuit, module, software code or program that can provide information on the day and time to the controller circuit 108. For example, the real-time clock 116 can be a STMicroelectronics (ST) M41T00SM6 real time clock. In one embodiment, the non-volatile memory 118 can include one or more flash memory devices having a sufficient capacity, collectively or individually, to store time-stamped records from the controller circuit 108 for a predetermined time period such as one month. In other embodiments, the non-volatile memory 118 can use other types of memory devices, e.g., a battery backed random access memory (RAM), an Electrically Erasable Programmable Read-Only Memory (EEPROM), and a magnetic disk, in addition to flash memory devices and can be sized to have the necessary capacity to store any selected amount of time-stamped records. For example, the non-volatile memory can be an Atmel AT25256AN-10SU-2.7 EEPROM (256 kBit, SPI interface). After the records have been provided to the computer or gateway device, the corresponding locations in the non-volatile memory device 118 for those records can either be erased or marked for overwriting as new records are received. In addition, if the non-volatile memory device 118 has no available storage capacity for new records, the oldest time stamped records can be deleted or overwritten to make room for the new records.

Figure 2:
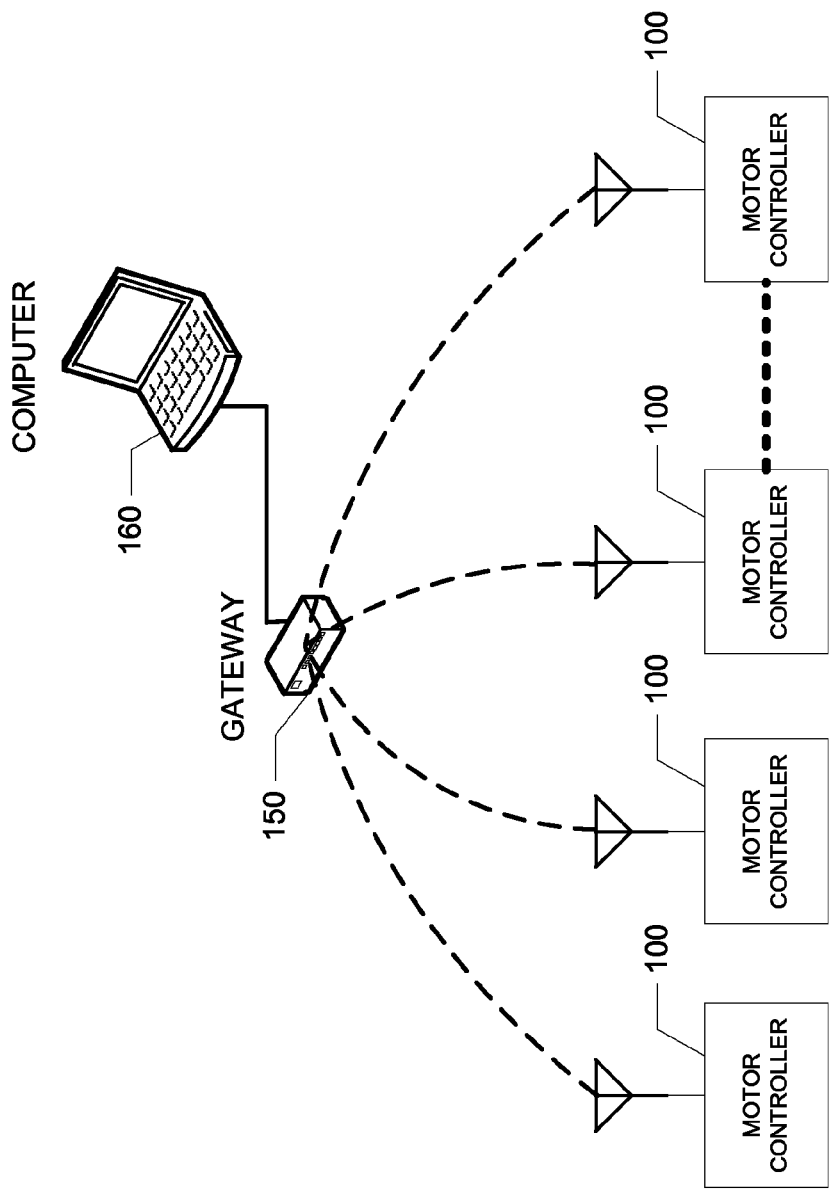
FIGS. 2 and 3 show exemplary embodiments of communication configurations for multiple motor controllers.
Figure 3:
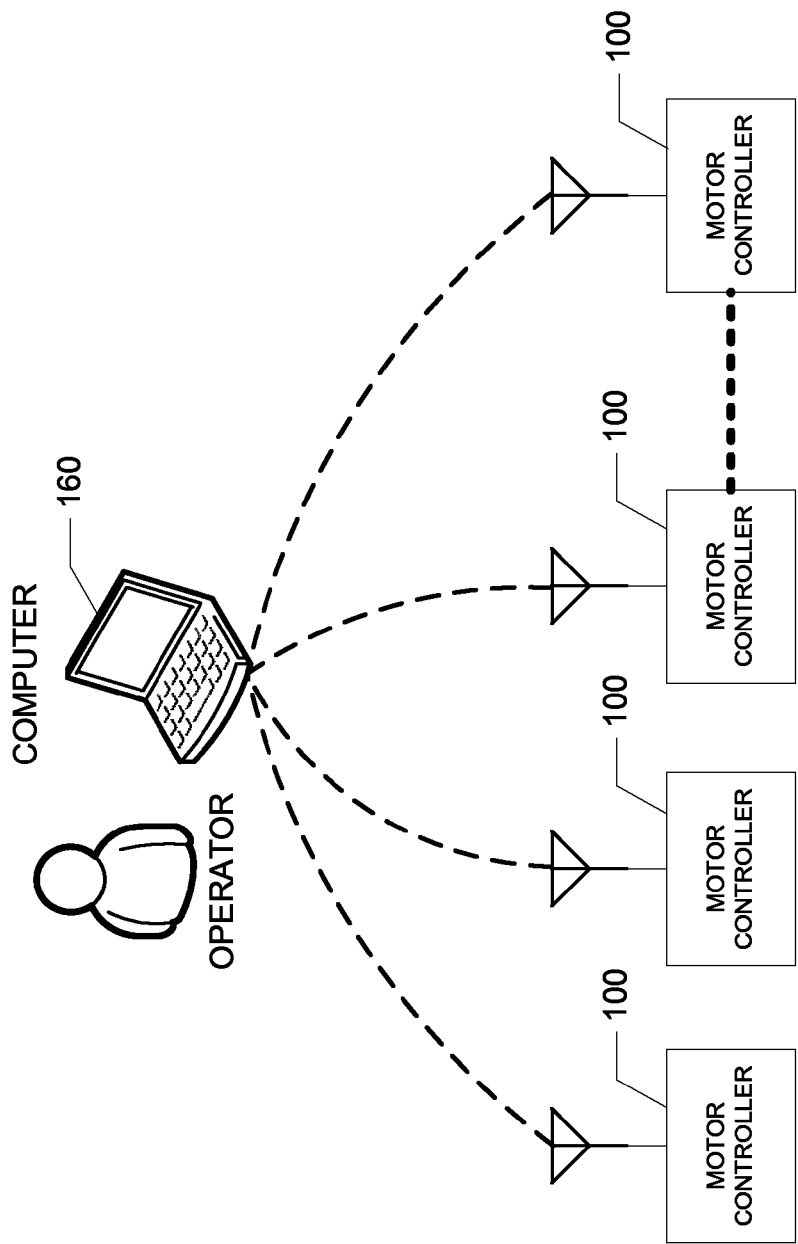

Referring now to FIG. 2, the controller 100 can also include a communication circuit 120 to transmit information relating to the operation of the controller 100 and/or the motor 104 from the controller 100 to a gateway device 150. Referring to FIG. 3, the controller 100 can also include a communication circuit 120 to transmit information relating to the operation of the controller 100 and/or the motor 104 from the controller 100 to a computer 160. Referring to FIGS. 2 and 3, the controller 100 can transmit stored information at any selected or scheduled time, such as on a predetermined interval, from the non-volatile memory 118 to the computer or gateway device. In another embodiment, the controller can only transmit stored information to the computer or gateway device in response to a request from the computer or gateway device. In another embodiment, the controller can transmit "real-time" information to the computer or gateway device. As shown in FIG. 1, the communication circuit 120 includes a wireless communication module. Referring again to FIGS. 2 and 3, in other embodiments, a direct wired connection between the communication circuit 120 and the computer or gateway device can be used in addition to or instead of the wireless communication connection. In an exemplary embodiment, the computer or gateway device can be configured to receive and process information from more than one controller 100. FIG. 2 shows multiple controllers 100 communicating with a gateway device 150, which gateway device 150 would then be configured to provide the received information to a user's computer. FIG. 3 shows multiple controllers 100 communicating directly with a computer 160 that is accessed by a user.

The controller 100 includes a relay 122, e.g., an electromechanical relay, to bypass power switch 106 and provide the full load current from the AC power source 102 to the motor 104. The relay 122 can be opened and closed automatically by the controller circuit 108 or in response to instructions or commands provided by a user. For example, the relay can be a Tyco 491-24T200 relay (SPST-NO, 20A contacts, 120 VAC coil). In another embodiment, the relay can be located separate from or external to the controller 100. The controller 100 can include an indicator 124 to provide information on the operation of the controller 100. In an exemplary embodiment, the indicator 124 can be a light emitting diode (LED) and the controller circuit 108 can activate or light the LED in response to the satisfaction of a particular condition by the controller.

Figure 4:
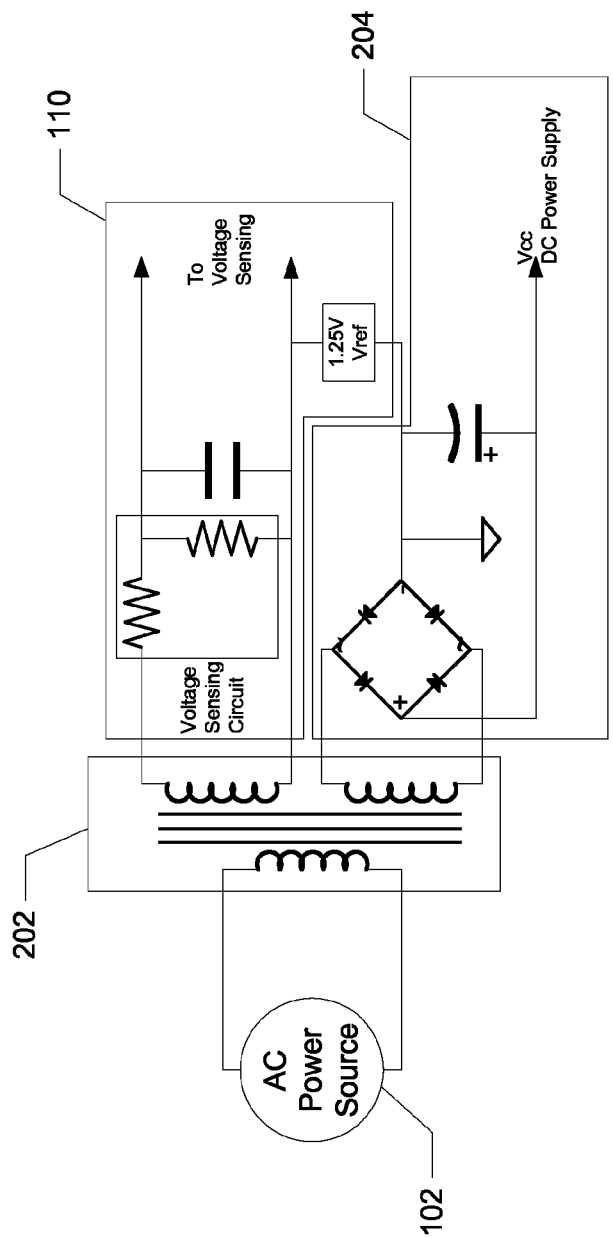
FIG. 4 schematically shows an exemplary embodiment of a voltage sensing circuit for the motor controller of FIG. 1.

FIG. 4 shows an exemplary embodiment of the voltage sensing circuit 110 of the controller 100. The voltage sensing circuit 110 can be connected to a secondary winding of a step-down transformer 202, such as 50/60 Hz AC transformer. For example, the step-down transformer can be a Pulse 030-7312.0 power transformer (2VA, 230V:12V:12V). As shown in FIG. 4, the voltage sensing circuit 110 uses a voltage divider circuit 204 to determine the voltage. By connecting the voltage divider circuit 204 to the secondary winding of the step-down transformer 202, the voltage divider circuit is able to generate an isolated signal that is representative of the AC voltage. In other embodiments, any suitable circuit, module or device can be used to measure, sense or determine the voltage. In an exemplary embodiment as shown in FIG. 4, a secondary winding of the step-down transformer 202 can be connected to a DC power supply circuit 204 to generate the DC power supply to power the controller circuit 108.

Figure 5:
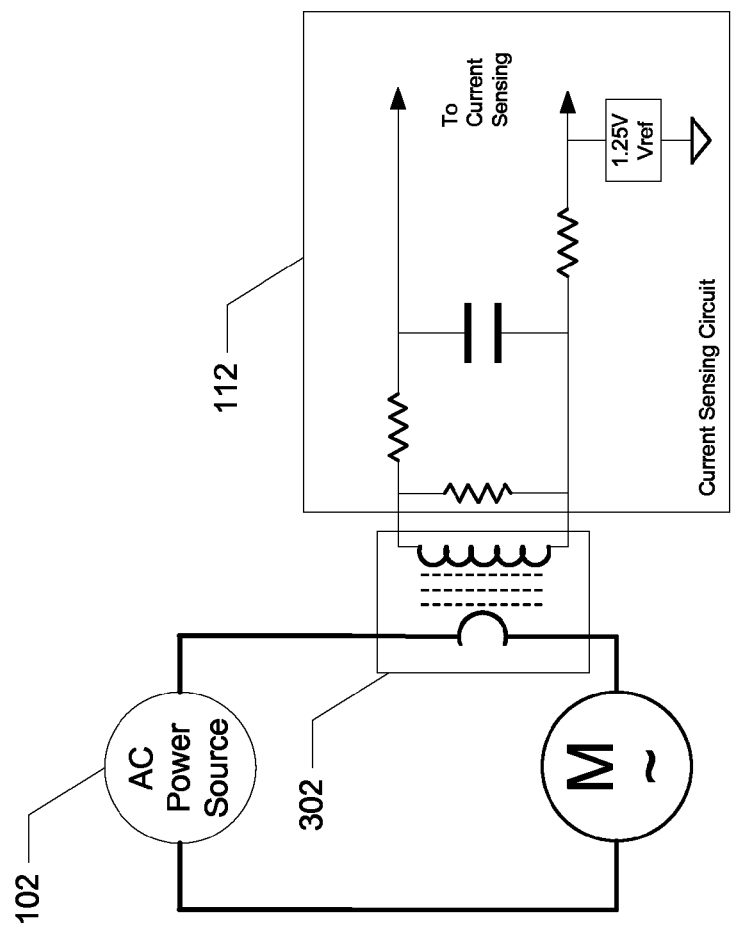
FIG. 5 schematically shows an exemplary embodiment of a current sensing circuit for the motor controller of FIG. 1.

FIG. 5 shows an exemplary embodiment of the current sensing circuit 112 of the controller 100. The current sensing circuit 112 can be connected to a secondary winding of a current transformer 302, such as 50/60 Hz AC current transformer with a wide bandwidth. For example, the current transformer can be a Triad CSE187L current sense transformer. As shown in FIG. 5, the current sensing circuit 112 uses a divider circuit to adjust the current signal. In other embodiments, any suitable circuit, module or device can be used to measure, sense or determine the current.

Figure 6:
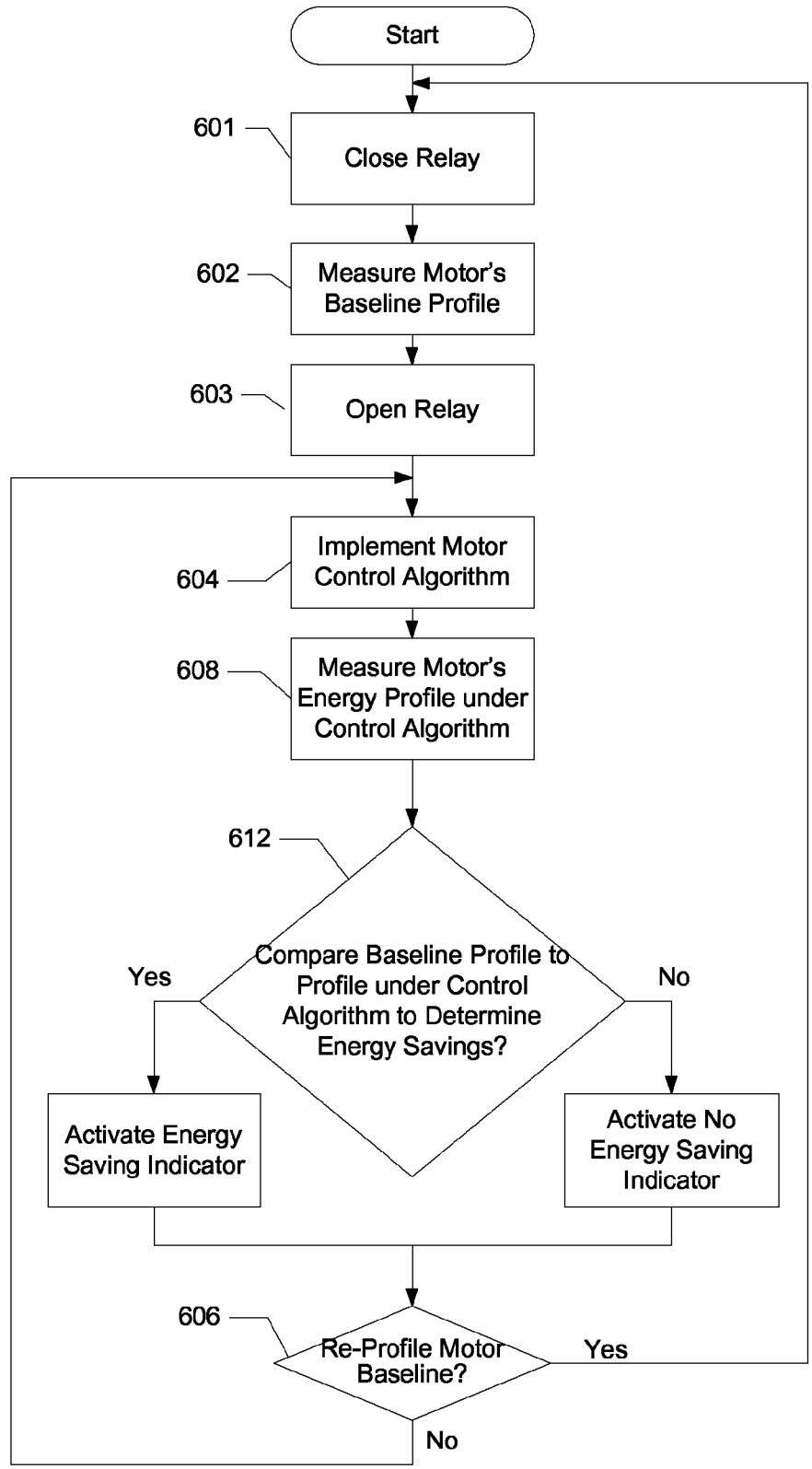
FIG. 6 shows a flow chart of an exemplary process for determining energy and power savings.

FIG. 6 shows a flow chart of an exemplary process for determining energy and power savings using the controller 100. The controller 100 can be used to establish or determine the power and energy baseline values of motor 104 either interactively with a human operator or autonomously using an internal or embedded program (step 602). To establish the baseline values for motor 104, the controller circuit 108 closes relay 122, either based on a user command or in response to an internal control instruction, to bypass the power switch 106 and provide full current and voltage from AC power source 102 to motor 104 (step 601). In another embodiment, instead of closing relay 122, the controller circuit can provide control signals to power switch 106 such that the full current and voltage from AC power source 102 is provided to motor 104 (step 603). The controller circuit then measures the AC voltage using the voltage measuring circuit 110 and measures the AC current using the current measuring circuit 112. The controller circuit 108 then uses the measured voltage and current to calculate a baseline operating profile for the motor 104, i.e., an RMS voltage (volts), an RMS current (amperes), a phase angle between the voltage and current waveforms (degrees), a real-power (watts) and a real-energy (watt-hour) for the motor 104 operating at baseline conditions, i.e., full current and voltage from AC power source 102.

After obtaining the baseline operating profile for the motor 104, the controller circuit 108 can disengage relay 122 and select a control algorithm, either based on a user command or in response to an internal control determination, to obtain energy savings or to obtain more efficient or economical operation of the motor 104 (step 604). The controller circuit 108 regulates the AC current and voltage provided to motor 104 with power switch 106 according to the selected control algorithm. When the controller circuit 108 is executing one of the control algorithms, the controller circuit 108 is also continuously monitoring, time-stamping and logging or storing the metering parameters for the motor 104, i.e., the voltage (RMS volts), the current (RMS amperes), the phase angle (degrees), the real-power (watts), and the real-energy (watt-hour), while executing the particular algorithm (step 608). During the execution of one of the control algorithms, the controller circuit 108 can continuously compare the power and energy values for the motor 104 against the motor's baseline power and energy profile to determine if any energy savings have been obtained from executing the control algorithm (step 612).

The continuous comparison of operating power and energy consumption with the baseline power and energy consumption enables the controller 100 to report, in real-time, on the amount of savings, if any, being obtained from the execution of a particular control algorithm. The reported information from the controller 100 can then be used to assist a human operator in refining the operation of motor 104. The information from the controller 100 can be stored and then reported as a detailed dataset transmitted to the user using communication circuit 120 or can be stored and/or displayed with indicator 124, e.g., a green LED, to provide a visual indication when the controller 100 is realizing reduced power and energy consumption (step 612). In an exemplary embodiment, indicator 124 can include multiple LED's or a display screen to provide a user with additional information regarding the reduction in power and energy consumption by the controller 100. Furthermore, the data collection and comparison process can be conducted at every motor that has an installed controller 100. By conducting the data collection and comparison process at every motor with a controller, a more accurate understanding of energy savings performance for the entire population of motors with controllers can be obtained.

Since the controller 100 has integrated electric metering and data logging functions, the data collection and comparison by the controller 100 can be a permanent and automated process that does not require the cost of an external meter, data logger and the installation labor to use the external meter and data logger. Furthermore, the controller 100 can periodically reestablish the baseline power and energy profile of the motor 104 (step 606) without incurring additional cost by closing relay 122 and determining the power and energy profile of the motor based on full current and voltage from the AC power source (step 602). The updating of the baseline profile on a regular basis can improve the accuracy of the energy savings calculations compared to a baseline profile calculated a single time. In an exemplary embodiment, the controller 100 can be configured to automatically reestablish the baseline power and energy profile for the motor 104 at a predetermined interval, such as every calendar month, or when the operating conditions of the motor 104 have changed as sensed by the controller 100, e.g., when the motor's current is above a threshold for a predetermined time period. Furthermore, as the load profile of the motor 104 changes, the baseline profile for the motor should be recalculated to permit more accurate energy savings calculations to be made by controller 100.

In an exemplary embodiment, the controller 100 can include an analysis function that can detect the operational state of the motor 104 and its mechanical load using the historical records stored in non-volatile memory 118, and then automatically select an energy saving algorithm for the motor based on the detected operational state. In one embodiment, the controller 100 can select a load factor based algorithm if the motor's load is sensed to be changing cyclically from loaded conditions to idle conditions and can select a variable speed algorithm if the motor's load is sensed to be based on inertial loading conditions, e.g., air flow.

In another exemplary embodiment, the motor controller can identify and flag unhealthy and failure conditions of the motor and its mechanical load using historical records stored in non-volatile memory 118. In one embodiment, the controller can detect that the motor current has exceeded the full load amperage rating of the motor for a predetermined period. In another embodiment, the controller can detect periodically occurring current spikes that can be indicative of a breakdown in the motor's dielectric materials.

In a further exemplary embodiment, the controller 100 can identify and flag, with time-stamps, operating conditions when the motor 104 is not realizing the expected saving level. For example, the power and energy consumption of the motor can be continuously compared with the baseline power and energy consumption of the motor and a flag signal can be generated when the measured power and energy consumption of the motor exceeds the baseline power and energy consumption for the motor.

While only certain features and embodiments of the invention have been shown and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A method of determining performance of a controller for an alternating current (AC) motor, the method comprising:
    installing a controller between an AC power source and the AC motor, the controller having a control algorithm to control operation of the AC motor;
    executing a first algorithm to obtain a first data set relating to the operation of the AC motor, the step of executing a first algorithm comprising:
        closing a relay in the controller to provide AC power directly to the AC motor from the AC power source;
        measuring data relating to the AC motor in response to the relay being in a closed position; and
        storing in the first data set the measured data relating to the AC motor in response to the relay being in a closed position;
    executing a second algorithm to obtain a second data set relating to the operation of the AC motor, the step of executing a second algorithm comprising:
        opening the relay in the controller to prevent direct transfer of AC power from the AC power source to the AC motor;
        controlling activation of a power switch in the controller with the control algorithm to control the AC power provided to the AC motor;
        measuring data relating to the AC motor in response to controlling activation of the power switch in the controller with the control algorithm; and
        storing in the second data set the measured data relating to the AC motor in response to controlling activation of the power switch in the controller with the control algorithm;
    comparing the second data set to the first data set to calculate a difference between the second data set and the first data set; and
    communicating the difference to a user, wherein the communicated difference is representative of a change in performance of the AC motor resulting from executing the control algorithm.

2. The method of claim 1 further comprises performing the step of executing the first algorithm at a predetermined interval.

3. The method of claim 1 further comprises performing the step of executing the first algorithm in response to a change in operating conditions of the AC motor or a change in a load profile of the AC motor.

4. The method of claim 1 further comprises continuously performing the steps of communicating the difference to a user, comparing the second data set to the first data set, and executing a second algorithm.

5. The method of claim 1 wherein:
    the step of storing in the first data set the measured data relating to the AC motor in response to the relay being in a closed position comprises applying a first time-stamp to the measured data relating to the AC motor in response to the relay being in a closed position; and
    the step of storing in the second data set the measured data relating to the AC motor in response to controlling activation of the power switch in the controller with the control algorithm comprises applying a second time-stamp to the measured data relating to the AC motor in response to the measured data relating to the AC motor in response to controlling activation of the power switch in the controller with the control algorithm.

6. The method of claim 1 further comprises transmitting data from at least one of the first data set and the second data set to a user at a predetermined interval.

7. The method of claim 1 wherein the step of executing a second algorithm comprises selecting the control algorithm from a plurality of control algorithms.

8. The method of claim 1 wherein the step of communicating the difference to a user comprises activating a light emitting diode.

9. The method of claim 1 wherein the first data set and the second data set each comprise data on motor voltage, motor current, phase angle, real-power and real-energy.

10. A controller for an alternating current (AC) motor comprising:
    an input connection to receive AC power from an AC power source;
    an output connection to provide AC power to an AC motor;
    a power switch connected to the input connection and the output connection;
    a relay electrically connected in parallel with the power switch;
    a controller circuit configured to activate the power switch and to open and close the relay;
    the power switch being configured to permit transfer of AC power from the input connection to the output connection in response to being activated by the controller circuit;
    the relay being configured to bypass the power switch when in a closed position to permit transfer of AC power between the input connection and the output connection;
    a memory device storing a control algorithm executable by the controller circuit, the control algorithm being configured to control activation of the power switch by the controller circuit, and the memory device being configured to store performance data on the AC motor;
    the controller circuit being configured to obtain performance data on the AC motor by collecting and comparing performance data on the AC motor in response to the AC power to the AC motor being controlled by the relay and in response to the AC power to the motor being controlled by the power switch.

11. The controller of claim 10 further comprises a clock configured to provide date and time information, the date and time information from the clock being associated with the performance data when stored.

12. The controller of claim 10 further comprises a communication circuit configured to transmit and receive data to a computer accessible by a user.

13. The controller of claim 12 wherein the communication circuit is configured to transmit and receive data wirelessly.

14. The controller of claim 10 further comprises a display configured to provide information on the performance data of the AC motor.

15. The controller of claim 14 wherein the display comprises a light emitting diode.

16. The controller of claim 10 further comprises:
- a voltage sensing circuit configured to determine an AC voltage associated with the AC motor; and
- a current sensing circuit configured to determine an AC current associated with the AC motor.

17. The controller of claim 10 wherein the power switch is selected from the group consisting of a triode alternating current switch; two silicon controlled rectifiers connected in parallel, a metal oxide semiconductor field effect transistor, an insulated gate bipolar transistor, and combinations thereof.

18. The controller of claim 10 wherein the memory device comprises a device selected from the group consisting of a flash memory device, an electrically erasable programmable read-only memory and combinations thereof.

19. The controller of claim 10 wherein the memory device stores a plurality of control algorithms and the controller circuit is configured to select a control algorithm from the plurality of control algorithms for execution.

20. The controller of claim 10 further comprises a sensor to measure a parameter of the AC motor, the measured parameter being an input to the control algorithm.

* * * * *